United States Patent
Oehring et al.

(10) Patent No.: US 7,870,670 B2
(45) Date of Patent: Jan. 18, 2011

(54) PROCESS INCLUDING INTERMETALLIC TITANIUM ALUMINIDE ALLOYS

(75) Inventors: Michael Oehring, Geesthacht (DE); Jonathan Paul, Hamburg (DE); Fritz Appel, Geesthacht (DE)

(73) Assignee: GKSS-Forschungszentrum Geesthacht GmbH (DE)

( * ) Notice: Subject to any disclaimer, the term of this patent is extended or adjusted under 35 U.S.C. 154(b) by 1190 days.

(21) Appl. No.: 10/906,569

(22) Filed: Feb. 24, 2005

(65) Prior Publication Data

US 2006/0138200 A1    Jun. 29, 2006

(30) Foreign Application Priority Data

Feb. 26, 2004    (EP)    ................... 04004407

(51) Int. Cl.
    *B21D 53/78* (2006.01)
    *B21K 3/04* (2006.01)
(52) U.S. Cl. .................... 29/889.7; 29/889; 29/889.2; 228/178
(58) Field of Classification Search ............. 29/896.4, 29/896.41, 896.411, 896.412, 896.42, 896.43, 29/896.7, 889.7, 889, 889.2; 63/15; 419/36, 419/61; 75/252, 255; 228/157, 178; 82/101
    See application file for complete search history.

(56) References Cited

U.S. PATENT DOCUMENTS 5,118,026 A * 6/1992 Stacher .................. 228/157
5,190,603 A   3/1993 Nazmy et al.
6,644,151 B2 * 11/2003 Forster et al. ............. 82/101

FOREIGN PATENT DOCUMENTS

| GB | 2239214 | 6/1991 |
|---|---|---|
| JP | 05-104259 | 4/1993 |
| JP | 11-077365 | 3/1998 |
| JP | 10-504367 | 4/1998 |
| RU | 2175606 | 11/2001 |
| SU | 160659 | 1/1964 |
| WO | WO03008655 | 1/2003 |

* cited by examiner

*Primary Examiner*—Rick K Chang
(74) *Attorney, Agent, or Firm*—Hovey Williams LLP

(57) ABSTRACT

The invention proposes a process for producing components (10) or semi-finished products which contain intermetallic titanium aluminide alloys, which includes the following process steps: rough contouring of a plurality of plate-like bodies (11) so as to correspond to a desired final shape of the component (10) or semi-finished product, some of these plate-like bodies or all the plate-like bodies consisting of titanium aluminide alloys; carrying out surface-to-surface joins between the plurality of plate-like bodies (11) stacked on top of one another so as to form an overall body (10); and forming the desired final shape of the overall body (10). The invention also concerns a component, in particular for jet engines, which is produced using this process.

26 Claims, 3 Drawing Sheets

Figure 1:
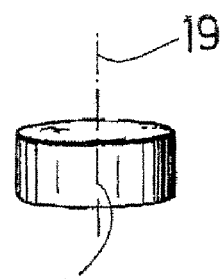

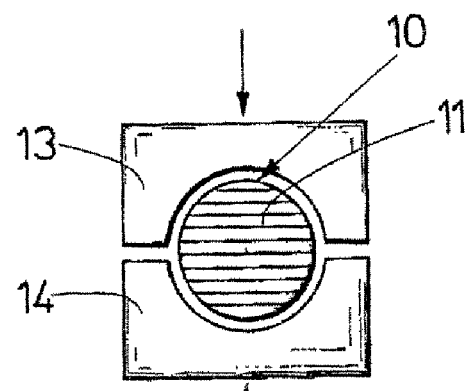
Fig. 4
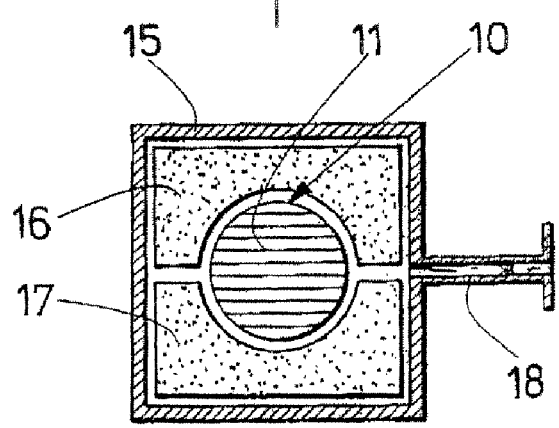
Fig. 5
Fig. 6
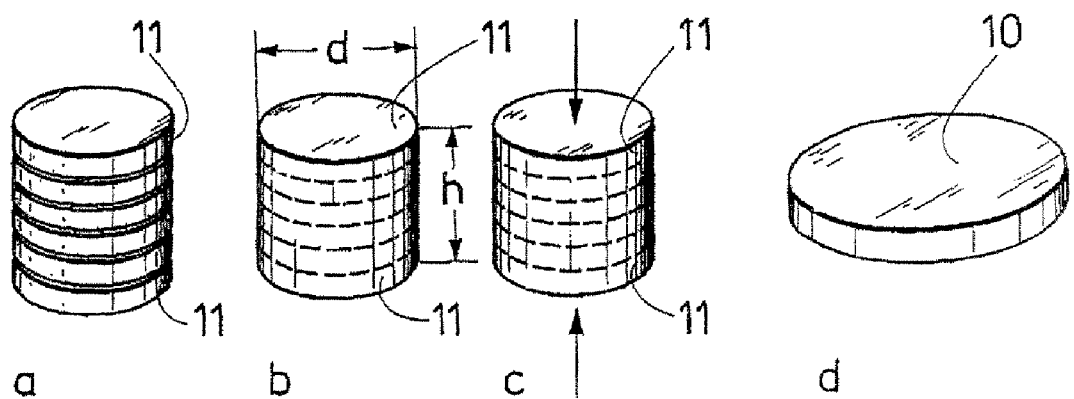

PROCESS INCLUDING INTERMETALLIC TITANIUM ALUMINIDE ALLOYS

RELATED APPLICATION

This Application claims priority of European Application Serial No. 04004407.5 filed Feb. 26, 2004, which is hereby incorporated by reference herein.

BACKGROUND OF THE INVENTION

1. Field of the Invention

The invention relates to a process for producing components or semi-finished products which contain intermetallic titanium aluminide alloys, and to components producible by means of the process.

2. Discussion of Prior Art

Components or semi-finished products made from intermetallic titanium aluminide alloys of conventional type, as are known in the prior art, if produced by means of conventional production processes, have drawbacks or deficits in terms of their strength, their creep properties and their ability to withstand high temperatures which are caused by the particular metallurgical features of these materials.

Titanium aluminide alloys which are of industrial importance contain 40 to 50 At. % of aluminium and up to 15 At. % of other elements, for example Nb, Cr, Si, B and C, remainder titanium. Alloys of this type are composed of $\gamma$ (TiAl) as majority phase and $\alpha_2$ (Ti$_3$Al) as minority phase. Further minority phases may also be present depending on the alloy composition and heat treatment. Examples of industrial titanium aluminide alloys include the following (details in At. %):

Ti-48Al-2Cr-2Nb
Ti-47Al-1Cr-1Nb-0.5B
Ti-44Al-4Nb-4Zr-0.5Si
Ti-45Al-10Nb-0.2B-0.2C.

Alloys of this type are generally distinguished by a low density, high modulus of elasticity, good strength and good resistance to oxidation. On account of these unusual properties, the titanium aluminide alloys are of considerable interest for applications in high-temperature technologies. However, an obstacle to the industrial use of the alloys is the high brittleness, which remains up to very high temperatures. Therefore, material defects or even inhomogeneities in the microstructure have an extremely disadvantageous effect on the strength and reliability of the components produced from these alloys. It has not hitherto been possible to significantly improve the low brittleness and tolerance of damage of the titanium aluminide alloys which is predetermined by the nature of the intermetallic phases by means of alloying effects. Therefore, development work aimed at suitable processes for producing titanium aluminide alloys have been concentrated on identifying process parameters for conventional metallurgical processes, such as for example casting or hot-forming, which allow very fine and chemically and structurally homogeneous microstructures to be established. On the one hand, this means that the potential for high-temperature properties cannot be fully utilized, since the fine microstructures which are set, by way of example, reduce the creep strength and toughness of the alloys. Secondly, the mechanical properties achieved in certain components are restricted by the fact that the microstructures inevitably are not fully homogeneous across the component cross sections. The reason for this is the microstructure morphology is often dependent on the local component cross section which, for example in the case of production by forging, determines the local degree of deformation, or in the case of production by casting processes determines the local cooling rate.

Like other intermetallic phases, the majority phase $\gamma$ (TiAl), which is present in $\gamma$-titanium aluminide alloys, on account of its crystal structure, has considerable anisotropies in, for example, the elastic or plastic properties. Moreover, the lamellar microstructures which are preferentially established in titanium aluminide alloys boost the anisotropy of the mechanical properties. Therefore, in components certain crystal orientations of the grains are to be avoided as far as possible by the production process. However, the texture of components with greatly varying cross sections and also the microstructure can only be controlled to a limited extent over the component cross section as a whole, which in turn means that the full potential of the properties cannot be exploited.

Currently, titanium aluminide alloys can already be supplied in all product forms which are standard in metallurgy, including castings, deformed semi-finished products and powders.

The casting of titanium aluminide alloys is a relatively inexpensive production process and is suitable in particular for the production of components with a complex geometry. However, the technique is highly complex on account of the high melting point of approx. 1460° C. and the strong reactivity of titanium aluminide alloys. The mold-filling properties of titanium aluminide alloys are limited. Therefore, special casting techniques, for example centrifugal casting, are required for the production of finely shaped components. Phase transformations and ordering reactions which lead to inevitable segregation of the alloying elements and to a very pronounced cast texture occur during the solidification and further cooling of the molten material. The microstructure formed during the solidification depends on the cooling rate and can therefore vary with the wall thickness of the component. Voids and pores often occur in castings. These quantity deficits which have been listed above increase as the component size grows and cannot be tolerated for many applications.

As in the case of conventional materials, deformation technologies, such as forging or extrusion, are used to consolidate and refine the chemically and structurally very inhomogeneous castings. The improvement to the microstructure which can thereby be achieved depends primarily on the degree of deformation which can be achieved during the deformation. In the case of titanium aluminide alloys, the extent of the deformation is greatly limited in particular by the tendency of the material towards brittle fractures. As a result, cracks preventing further deformation are often formed prematurely at the periphery of forged bodies. Therefore, the degree of deformation during forging of titanium aluminide alloys is generally limited to 80%. However, this does not allow satisfactory refining and consolidation of the microstructure to be achieved. The semi-finished products which have been deformed in this way often still have regions in which the coarse cast microstructure is still present; moreover, the microstructures are still very inhomogeneous in chemical terms. Semi-finished products of this type are of only limited use for components which are subject to high levels of load.

During extrusion, high hydrostatic compressive stresses are superimposed on the deformation, which very effectively prevents the formation of cracks. This makes it possible to achieve significantly higher degrees of deformation than during forging, with the result that the quality of the microstructure is considerably improved. However, despite the extensive deformation, there are still considerable structural and chemical inhomogeneities in extruded semi-finished products as well, and these inhomogeneities greatly restrict the use of the material for components which have any safety relevance. A particular drawback for further component manufacture is that extrusion forms very slender semi-finished products. The cross section of the workpiece is usually reduced by a ratio of 10:1 or more. Currently, castings of sufficient quality can only be produced with a diameter of up to at most 300 mm. Extrusion forms semi-finished products which are only suitable for certain forms of component. However, an extruded material is eminently suitable for subsequent deformation by forging or rolling. This secondary deformation once again significantly improves the microstructure, so that the components produced therefrom can satisfy high quality demands. On account of the very slender form of extruded semi-finished products, however, subsequent forging can only fill small component volumes and in particular it is thereby impossible to produce large-area components.

However, thin metal sheets and plates of relatively large area can be produced from extruded material by rolling. On account of the rolling deformation, these metal sheets and plates are very homogeneous in structural and chemical terms but have a considerable texture with respect to the rolling direction and are therefore anisotropic in mechanical terms.

The drawbacks of the casting and deformation technologies listed above can be avoided when using powder metallurgy production processes. In these processes, pre-alloyed titanium aluminide powders are compacted a number of times by hot isostatic pressing, for which in principle there is no restriction on the size of the compacted bodies. A further advantage of these powder metallurgy production processes is that the compacted bodies are very homogeneous in structural and chemical terms and moreover do not have any texture. The mixing of powders of different composition and different microstructure also allows the profile of the mechanical properties to be varied. Therefore, titanium aluminide semi-finished products produced by powder metallurgy at first glance appear particularly suitable for the production of large components by subsequent forging.

However, a serious drawback of powder metallurgy techniques is that atomization gas is often included in the powder particles. This atomization gas is released during subsequent deforming steps and then leads to porosity. Therefore, for components which are subject to high loads and are of relevance to safety, the use of materials produced by powder metallurgy is generally avoided.

OBJECTS AND SUMMARY OF THE INVENTION

Consequently, it is an object of the present invention to provide a process which allows components or semi-finished products to be produced from metals or metal alloys which can be subjected to high loads, may have a high geometric expansion, have a very high temperature resistance and do not have the drawbacks of the components produced by means of the known production processes which have been listed above and are known from the prior art, it being possible for the process for producing these components or semi-finished products to be carried out in a simple way and to be substantially based on conventional production process steps which are known in the prior art, the intention being for it to be possible to use the process according to the invention to provide components and semi-finished products having properties which are not present in the components and semi-finished products produced by means of known production processes.

According to the process of the invention, the object is achieved by the following process steps:

a. rough contouring of a plurality of plate-like bodies so as to correspond to a desired final shape of the component or semi-finished product, some of the plate-like bodies or all the plate-like bodies consisting of titanium aluminide alloys, b. carrying out surface-to-surface joins between the plurality of plate-like bodies stacked on top of one another so as to form an overall body, and c. forming the desired final shape of the overall body.

The main advantage of the solution according to the invention consists in the fact that the starting bodies for forming the embodiment of the overall body formed in the last process step are relatively thin, areal metal sheets or plates which are produced as semi-finished products by deformation technologies such as rolling, extrusion or forging and can therefore be provided at low cost. According to the invention, however, it is also possible to use sheet- or plate-like metal or metal alloy semi-finished products which have been producible by casting or by powder metallurgy processes.

In the context of the invention, the three-dimensional final shape of the components is built up in layers from plate-like bodies. These individual plate-like bodies, which form layers, take the form of parallel cut surfaces through the component and can be regarded as component discs.

The term "rough contouring" in accordance with process step a. is to be understood as meaning that after the plate-like or disc-like bodies have been stacked on top of one another a slightly over-dimensioned initial shape is selected for the component that is to be produced in accordance with the invention. Curved component shapes can also be formed by corresponding stepped rough contouring of the plate-like or disc-like bodies by stacking, which therefore have a three-dimensionally stepped contoured surface.

The plate-like or disc-like bodies produced by rolling, extrusion, forging, casting or powder metallurgy processes, on account of these techniques, have a predetermined microstructure and texture which is defined for the overall body in accordance with the predetermined, desired specifics. The drawbacks of overall bodies produced by means of known processes do not arise in this case, since the properties of the overall body formed from the plate-like bodies are defined layer by layer.

The joining of the plurality of the plate-like bodies stacked on top of one another to one another to form an overall body can be achieved by suitable joining processes. Therefore, no changes to the microstructure are produced in the interior of the overall body by the joining operation.

The formation of the desired final shape in accordance with process step c. can be carried out by means of known deformation processes, but the plate-like bodies which have been joined to one another in the process retain their microstructure.

According to an advantageous configuration of the process, the rough contour of the plate-like bodies is formed by means of chipless shaping, for example by stamping the plate-like bodies out of semi-finished products in sheet or plate form.

However, it is also possible for the coarse structure of the plate-like bodies to be realized preferably by cutting, which can be effected mechanically or, for example, by laser cutting processes or the like.

The joining of the plurality of plate-like bodies which have been stacked on top of one another to one another to form the overall body may advantageously be carried out by diffusion welding. The diffusion welding can be carried out at relatively low temperatures of 900-1100° C. and pressures of 20-100 MPa, so that apart from the immediate weld zone there are no changes to the microstructure of the material of the plate-like bodies.

In another advantageous configuration of the process, the plate-like bodies which have been stacked on top of one another are joined to one another by forming respective soldered joins between the plate-like bodies.

The formation of the final shape of the overall body may preferably be realized by forging the overall body, which has the advantage that this forging operation leads to additional consolidation and chemical homogenization of the material, and the microstructural changes which are present in the weld zones are in the process virtually completely reversed. This is extraordinarily advantageous for safety-relevant components which are subject to high levels of loading.

In principle, all suitable processes, for example a material-removing machining process in machine tools or final shaping by means of known erosion processes, are suitable for forming the final shape of the overall body in accordance with process step c. These machining processes may also be used in addition to forging to form the final shape of the overall body.

In a certain procedure, for example a combination of the operation of joining the plate-like bodies to one another and subsequent forging, it may be advantageous, in order to reduce time and costs, to carry out the joining of the plate-like bodies which have been stacked on top of one another and/or the formation of the final shape of the overall body under a vacuum or under an inert gas atmosphere. In the case of the specific production process of forging under a vacuum or an inert gas atmosphere, it must be ensured that the joining zones of the plate-like bodies do not combine with oxygen, for example by means of diffusion welding.

The process is extremely advantageous for the formation of an overall body in which the plate-like bodies which form the overall body in each case consist of different titanium aluminide alloys. By way of example, it is possible to use plate-like bodies with different compositions, different microstructures, different textures and different composition. For example, it is possible to use two-phase titanium aluminide alloys with very different compositions for the individual plate-like bodies and in this way, for example, to take account of the respective different oxidation resistance of the alloys and different strength of the alloys.

This, by way of example, takes account of the fact that the oxidation resistance of the titanium aluminide alloys increases as the aluminium content rises, and this oxidation resistance can be boosted still further by additions of Nb, whereas the strength of the titanium aluminide alloys increases with a decreasing aluminium content and can additionally be influenced by alloying elements, such as Nb, Mo, W, B, C or Si.

The process may advantageously be refined in such a manner that the plate-like bodies which form the overall body have a different microstructure and/or a different texture. In particular the two-phase titanium aluminide alloys can be produced using very different microstructures. The mechanical properties of the titanium aluminide alloys of this type which form the individual plate-like bodies are highly dependent on the relative volumetric proportions of the globular $\gamma$ (TiAl) grains, $\alpha_2$ (Ti$_3$Al) grains and lamellar colonies which form the microstructures, with the result that, taking account of these relationships, defined layers or discs formed from the plate-like bodies can be positioned in the final body in such a way that the desired overall properties of the final body can be determined in a defined way.

Finally, it is preferable for the process to be carried out in such a manner that the orientation of the surfaces of the bodies which have been stacked on top of one another is defined with respect to the orientation of the main loading direction of the final shape of the overall body which is formed.

All the measures which have been explained above in relation to the construction of the component producible by means of the process allow the realization of a graduated material which takes account of the very different loads in the various regions of the component. This relates not only to the composition of the metal or titanium aluminide alloy as such, which forms the individual plate-like bodies, but also to the deliberate attention paid to the main loading direction of the finally shaped overall body.

An example of a component produced by the process according to the invention as described above is a component for jet engines, which has to be able to withstand extremely high mechanical and thermal loads. A component of this type for jet engines is, for example, a rotor disc for jet engines or rotor structures per se, in which the rotor disc is provided with blades or vanes, known as blisks (blade integrated disc), or in which rotating rings provided with blades or vanes are used, known as blings (blade integrated ring).

Other aspects and advantages of the present invention will be apparent from the following detailed description of the preferred embodiments and the accompanying drawing figures.

BRIEF DESCRIPTION OF THE DRAWING FIGURES

Figures 2A, 2B:
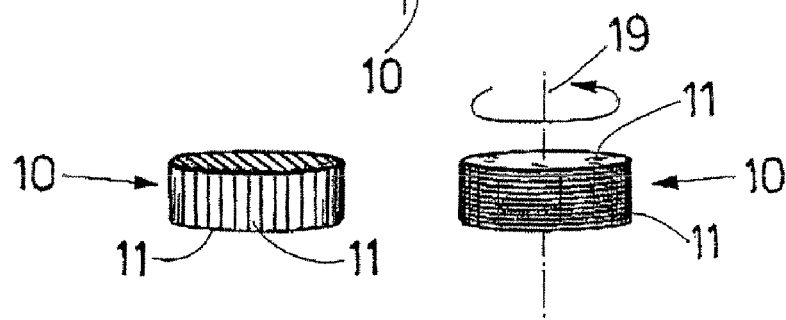
Figure 3:
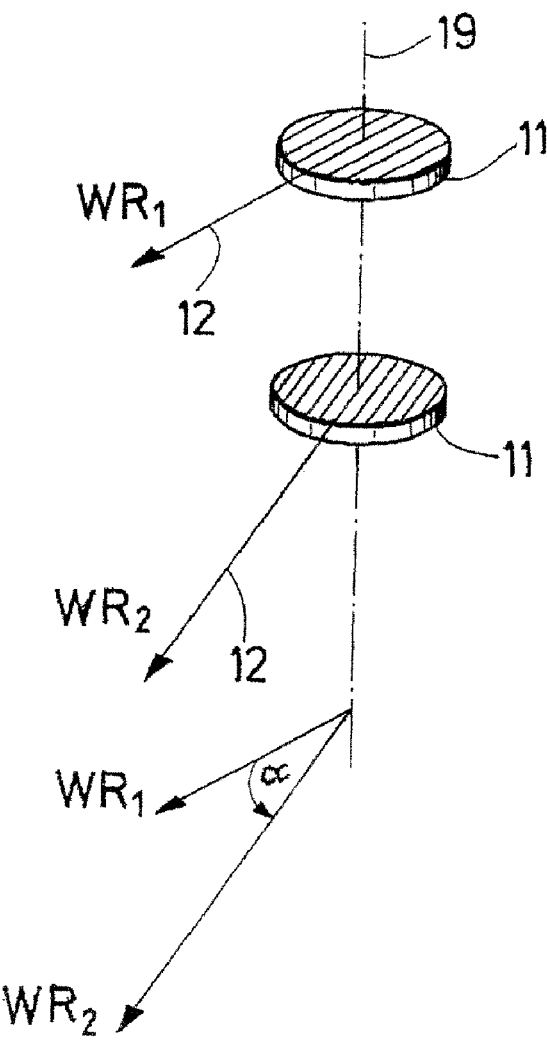
Figure 7:
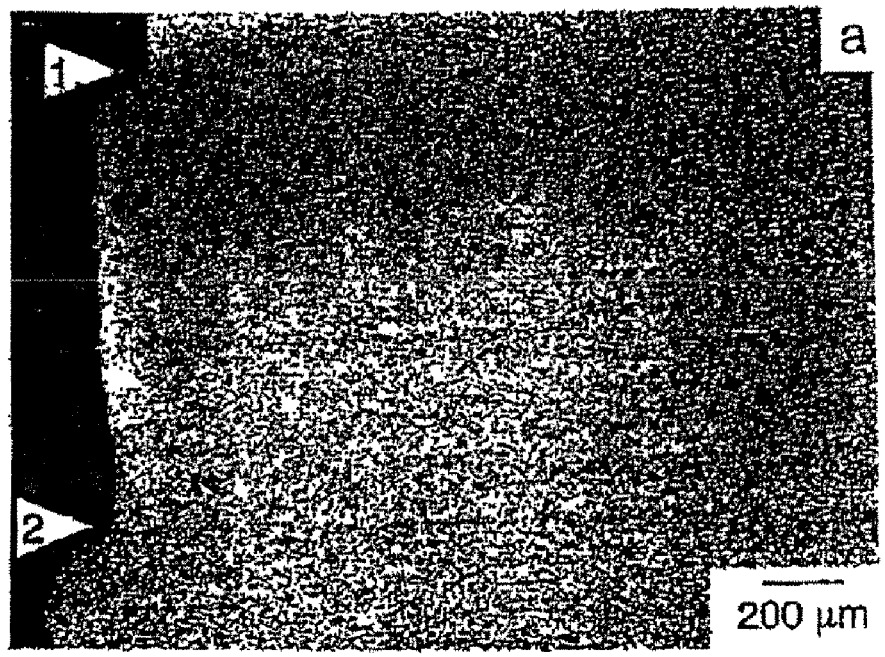
Figure 8:

Exemplary embodiments of the invention will now be described in detail below with reference to the following diagrammatic drawings. In the drawings:

FIG. 1 shows a perspective illustration of a component which is to be constructed from plate-like bodies in accordance with the process, FIG. 2a shows the construction of a component in accordance with FIG. 1, assembled from vertically stacked plate-like bodies, FIG. 2b shows a construction of the component in accordance with FIG. 1 with horizontally layered plate-like bodies, FIG. 3 shows a vertically exploded illustration of a component in accordance with FIG. 2b, in which, by way of example, two plate-like bodies in disc form are oriented at different angles a with respect to their rolling direction WR (only two plate-like bodies are illustrated to explain the principle), FIG. 4 diagrammatically depicts a die for introducing compressive stresses during joining of the plate-like bodies by means of diffusion welding, the component being formed from a plurality of plate-like bodies in accordance with FIG. 2b, FIG. 5 diagrammatically depicts the die in accordance with FIG. 3 with an additional slide link for transmitting the hydrostatic stress during hot isostatic pressing and a vacuum-tight encapsulation, FIG. 6 diagrammatically depicts the individual steps involved in producing a component from plate-like bodies designed in disc form, step a. illustrating plate-like bodies which have been stacked on top of one another, step b. illustrating the plate-like bodies which have been joined by diffusion welding, step c. illustrating the step of forging the preform and step d. showing the finished component in its desired final shape, FIG. 7 shows a section in the form of an image taken by means of a scanning electron microscope through a component in order to illustrate the joining zone following the diffusion welding of a component formed from eight plate-like bodies made from an industrial titanium aluminide alloy, and FIG. 8 shows a section through the joining zone in accordance with FIG. 6, but in a higher magnification.

DETAILED DESCRIPTION OF THE EXEMPLARY EMBODIMENTS

Reference is made first of all to the illustrations in FIGS. 1, 2a and 2b. FIG. 1 shows the overall body 10 which is to be produced by means of the process described here. The overall body illustrated in FIG. 1 is in this case symmetrical with respect to an axis of rotation 19 (running vertically in the drawing).

Example 1

Production of a Disc-like, rotationally symmetrical component with a graduated material structure.

FIGS. 2a and 2b show the construction of an overall body or component 10 in the form of two different arrangements of plate-like bodies 11 which form the overall body 10. The arrangement of the layers formed by the plate-like bodies 11 within the overall body 11 is selected according to the expected main loading direction on the subsequent component. The arrangement of the plate-like bodies shown in FIG. 2b is selected for an overall body 10 which is subject to load from centrifugal forces as a result of rotation about the axis of rotation 19. In this case, the joins between the plate-like bodies 11, which when stacked on top of one another in a predetermined number form the overall body 11, are formed by welding or the like. In this case (FIG. 2b) the welded joins are not subject to tensile or shearing stresses. The component formed by the overall body 10 is only slightly influenced by the welded joins between the plate-like bodies 11 which have been stacked on top of one another.

However, an aspect which is very important for the properties of the overall body 10 is that this body can be designed to be matched to the expected load by using plate-like bodies 11 of different compositions and microstructures. In this context, the following selection rules apply:

plate-like bodies 11 with lamellar microstructures if a high resistance to crack propagation and a good creep resistance are required, plate-like bodies 11 with a duplex microstructure if a good ductility is desired, plate-like bodies 11 made from alloys with Nb contents of 5-10 At. % if a good resistance to oxidation is necessary, plate-like bodies 11 made from alloys with a basic composition Ti-45Al-(5-10)Nb—B—C for a high strength and creep resistance.

It is also possible for the anisotropies which are present in rolled metal sheets which, by way of example, form the starting material for the plate-like bodies 11 to be used to boost the strength properties of the component formed by the overall body 10 in certain directions, by identically oriented metal sheets being stacked on top of one another.

In the case of the arrangement of component discs shown in FIG. 2b, with the indicated loading by centrifugal forces, the mechanical properties have to be as isotropic as possible with respect to the axis of rotation 19. This can be achieved by the plate-like bodies 11 being rotated about the axis of rotation 19 of the component formed by the overall body 10 in such a way that the rolling directions 12 (WR), cf. also FIG. 3, of the individual plate-like bodies 11 are arranged uniformly around the axis of rotation 19 of the component formed by the overall body 10. If the component is constructed from n plate-like bodies 11, the angle a through which the rolling directions 12 of adjacent plate-like bodies have to be rotated with respect to one another is $\alpha=180°/n$. This is diagrammatically depicted in FIG. 3 for the two plate-like bodies 11, illustrated in that figure by way of example, of an overall body 10 constructed from n plate-like bodies.

The plurality of plate-like bodies, whether they are now constructed in accordance with FIG. 2a or in accordance with FIG. 2b, have previously been shaped with rough contouring in accordance with the desired final shape of the component 10, i.e. have been stamped, cut or suitably preshaped out of plate-like or sheet-like semi-finished products (not shown).

The plate-like bodies 11 which have been stacked on top of one another, irrespective of whether they have been stacked on top of one another in accordance with the illustration presented in FIG. 2a or in accordance with the illustration presented in FIG. 2b, are then joined to one another using a suitable joining process. If the plate-like bodies 11 consist exclusively of titanium aluminide alloys, diffusion welding is particularly suitable for carrying out the joins between the plate-like bodies 11, since this requires temperatures of 900-1000° C. at compressive stresses of 20-100 MPa. Under these conditions, there are no changes to the microstructure with the exception of the immediate weld zone, which is only a few μm wide.

FIGS. 6 and 7 show, as an example, images of the microstructure of a stack, joined by diffusion welding, of, for example, eight planar, plate-like bodies 11 which consist of an industrial titanium aluminide alloy. In this case, the plate-like bodies 11 were welded in a mechanical testing machine under a vacuum by the application of a compressive stress of 40 MPa, at a temperature of 950° C. and with the load being applied for a period of two hours.

It is clearly apparent from these images, which were taken by means of a scanning electron microscope, that scarcely any changes to the microstructure occur in the joining zone. Accordingly, diffusion welding is eminently suitable for use as a joining process (process step b.) for the production process according to the invention. Any graduated structure which may be set in the material that forms the plate-like bodies 11 is retained and can also be recognized in the overall body 11.

In the case of components with curved surfaces, the compressive stress required for diffusion welding has to be introduced via dies into which the negative shape of the component has been engraved.

This is diagrammatically depicted in FIG. 4 for the component shown in FIG. 2a. It should be noted that the die material must not react with the materials forming the plate-like bodies 11. Suitable die materials include molybdenum, SiC ceramics, $Si_3N_4$ ceramics or $Al_2O_3$ ceramics. However, up to temperatures of 1000° C. it is also possible to use conventional high-temperature alloys. The diffusion welding of plate-like bodies 11 consisting of titanium aluminide alloys has to be carried out under a vacuum or a suitable inert gas atmosphere.

Under the conditions indicated, the diffusion welding can also be carried out in a hot isostatic pressing installation. For this purpose, the plate-like elements 11 which have been stacked on top of one another have to be held in a suitable way and accommodated as far as possible in a positively locking way in an evacuated encapsulation. An arrangement of this type is diagrammatically depicted in FIG. 5 for the arrangement of plate-like bodies 11 shown in FIG. 2a. In this case too, reactions between the plate-like bodies 11 made from titanium aluminide alloys and the guide links 16, 17 need to be avoided. Examples of suitable guide link materials include molybdenum, SiC ceramics, $Si_3N_4$ ceramics or $Al_2O_3$ ceramics. Examples of materials which can be used for the encapsulation 15 may include stainless steel or titanium. If guide links 16, 17 are not used, reactions between the walls of the encapsulation 15 and the plate-like bodies 11 can be avoided, for example, by molybdenum foils (thickness >0.1 mm). The joining can be effected not only by diffusion welding but also, depending on the temperature of use, by other suitable techniques, for example brazing.

After the joining operation, the final shape of the overall body 10 can be produced by material-removing techniques which are customarily employed in metal machining, such as turning, drilling, milling, electro-erosion or electrochemical machining.

Example 2

Production of a Component in disc form by stacking plate-like bodies 11 on top of one another, welding the plate-like bodies 11 and then forging.

The process steps are to be described on the basis of the overall body 10 designed as a body of revolution as illustrated in FIG. 2b. First of all, as described in the above Example 1, the preliminary shape of the overall body 10 is produced from bodies 11 in disc or plate form. After the joining by means of welding, a further deformation step is carried out by forging, in which the final or virtually final shape of the desired component is produced.

The individual production steps are illustrated in FIG. 6. The height and diameter of the overall body 10 illustrated in FIG. 6b have to be determined on the basis of the final dimensions of the component designed in the form of a disc illustrated in FIG. 6d. The ratio h/d should be $\leqq 2$, so that kinking of the preform is avoided during forging. The forging can be carried out at temperatures of 950-1420° C., with degrees of deformation of at least 20% being particularly expedient. However, an important precondition for the forging is that the disc-like or plate-like bodies 11 have a relatively fine and chemically homogeneous microstructure. In this context, the plate-like bodies 11 should be produced from metal sheets or plates produced by deformation. The additional forging operation carried out results in an even better microstructure than the production process explained in Example 1 above. Moreover, the particular microstructures which are present in the weld zones are completely reversed. This is an important precondition for the manufacture of components which are subject to high levels of load, such as rotor discs for gas turbines.

The particular advantage of the process according to the invention compared to conventional forging techniques which are based on cast materials is that the plate-like bodies 11 have a particularly well consolidated microstructure. As a result, very intensive recrystallization sets in at low degrees of deformation. Materials of this type have good flow properties during forging. As a result, very complex shape changes can be achieved during the die forging, so that the components can be forged near net shape.

Example 3

Production of a component in disc form, combination of diffusion welding and forging in one operation.

The diffusion welding and forging can be combined in a single operation in order to reduce costs.

For this purpose, substeps b. and c. in accordance with FIG. 5 have to be combined. In the case of this production process, the forging must be carried out under a vacuum or a suitable inert gas atmosphere, so that the weld seams are not contaminated with oxygen. The forging itself may also be carried out in air, but for this purpose the stack formed from the plate-like bodies 11 must be encapsulated in accordance with the aspects described in Example 1 and FIG. 5.

Finally, reference is made once again to FIG. 7 and 8. FIG. 7 shows an image of the microstructure in the joining zone, taken by means of a scanning electron microscope, after the formation of the join between the plate-like bodies 11 by means of diffusion welding in the case of a stack composed of eight planar plate-like bodies 11 made from an industrial titanium aluminide alloy. The plate-like bodies were welded to one another at 950° C. for two hours in a test machine under a vacuum through the application of a stress of 40 MPa. The image shown in FIG. 7 marks two joining zones by means of arrows. FIG. 8 shows the location (arrow 2) in accordance with FIG. 7 in a higher magnification.

LIST OF REFERENCE NUMERALS

10—Overall body/component
11—Plate-like body
12—Rolling direction
13—Die
14—Die
15—Encapsulation
16—Link guide
17—Link guide
18—Vacuum suction connection piece
19—Axis of rotation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for producing components or semi-finished products which include one or more titanium aluminide alloys, said process comprising the steps of:
   a. rough contouring of a plurality of plate-like bodies, with each of the bodies consisting of said one or more titanium aluminide alloys, so that by means of the rough contouring an oversized preform of a geometry of the components or semi-finished products to be produced is formed,
   b. after step a, stacking the plurality of rough-contoured plate-like bodies,
   c. carrying out surface-to-surface joins between the plurality of plate-like bodies stacked on top of one another so as to form an overall body, and
   d. forming a desired final shape of the overall body.

2. The process according to claim 1, wherein the rough contour of the plate-like bodies is formed by chipless shaping.

3. The process according to claim 1, wherein the rough contour of the plate-like bodies is formed by cutting.

4. The process according to claim 1, wherein the plate-like bodies which have been stacked on top of one another are joined by diffusion welding.

5. The process according to claim 4, wherein the joining of the plate-like bodies and the forming of the final shape of the overall body take place in one apparatus.

6. The process according to claim 4, wherein at least one of steps b and c being performed under a vacuum.

7. The process according to claim 4, wherein at east one of steps b and c being performed under an inert gas atmosphere.

8. The process according to claim 1, wherein the plate-like bodies which have been stacked on top of one another are joined by soldering.

9. The process according to claim 1, wherein the final shape of the overall body is formed by cutting the overall body.

10. The process according to claim 1, wherein the plate-like bodies consist of different titanium aluminide alloys.

11. The process according to claim 10, wherein the plate-like bodies have different microstructures.

12. The process according to claim 10, wherein the plate-like bodies have different textures.

13. The process according to claim 1, wherein the orientation of the surfaces of the bodies which have been stacked on top of one another is defined with respect to the orientation of the main loading direction of the final shape which is formed.

14. A process for producing components or semi-finished products which include one or more titanium aluminide alloys, said process comprising the steps of:
   a. rough contouring of a plurality of plate-like bodies, with each of the bodies consisting of said one or more titanium aluminide alloys, so that by means of the rough contouring an oversized preform of a geometry of the components or semi-finished product products to be produced is formed,
   b. after step a, stacking the plurality of rough-contoured plate-like bodies on top of one another so as to form an overall stack, and
   c. joining the plate-like bodies which form the overall body and forming the desired final shape of the overall body, the joining and the formation of the final shape being carried out in a single operation.

15. The process according to claim 14, wherein the rough contour of the plate-like bodies is formed by chipless shaping.

16. The process according to claim 14, wherein the rough contour of the plate-like bodies is formed by cutting.

17. The process according to claim 14, wherein the plate-like bodies which have been stacked on top of one another are joined by diffusion welding.

18. The process according to claim 17, wherein the joining of the plate-like bodies and the forming of the final shape of the overall body take place in one apparatus.

19. The process according to claim 17, wherein at least one of the joining and forming steps of step c being performed under a vacuum.

20. The process according to claim 17, wherein at least one of the joining and forming steps of step c being performed under an inert gas atmosphere.

21. The process according to claim 14, wherein the plate-like bodies which have been stacked on top of one another are joined by soldering.

22. The process according to claim 14, wherein the final shape of the overall body is formed by cutting the overall body.

23. The process according to claim 14, wherein the plate-like bodies consist of different titanium aluminide alloys.

24. The process according to claim 23, wherein the plate-like bodies have different microstructures.

25. The process according to claim 23, wherein the plate-like bodies have different textures.

26. The process according to claim 14, wherein the orientation of the surfaces of the bodies which have been stacked on top of one another is defined with respect to the orientation of the main loading direction of the final shape which is formed.

* * * * *